United States Patent [19]

Chinnappa et al.

[11] 4,023,375
[45] May 17, 1977

[54] WATER-AMMONIA REFRIGERATION SYSTEM USING SOLAR ENERGY

[75] Inventors: James C. V. Chinnappa; David D. Karran, both of Georgetown, Guyana

[73] Assignee: The University of Guyana, Guyana

[22] Filed: Mar. 14, 1975

[21] Appl. No.: 558,385

[30] Foreign Application Priority Data

Oct. 23, 1974  United Kingdom ............. 24739/74

[52] U.S. Cl. .................................................. 62/2
[51] Int. Cl.² ..................................... F25B 27/00
[58] Field of Search .................. 62/2; 126/270, 271

[56] References Cited

UNITED STATES PATENTS

| | | | |
|---|---|---|---|
| 2,030,350 | 2/1936 | Bremser | 62/2 |
| 2,692,483 | 10/1954 | Hedlund | 62/2 |
| 3,242,679 | 3/1966 | Puckett et al. | 62/2 |

*Primary Examiner*—Lloyd L. King
*Attorney, Agent, or Firm*—Ladas, Parry, Von Gehr, Goldsmith & Deschamps

[57] ABSTRACT

Various interrelated ammonia solution, ammonia vapor, and liquid ammonia circuits are provided whereas solar radiation energy is used to boil such solution and produce ammonia vapor which is circulated into low pressure deabsorbing boilers to produce cooling effects suitable for air conditioning and food preservation. The intensity of the solar radiation is used to control alternative modes of operation.

6 Claims, 1 Drawing Figure

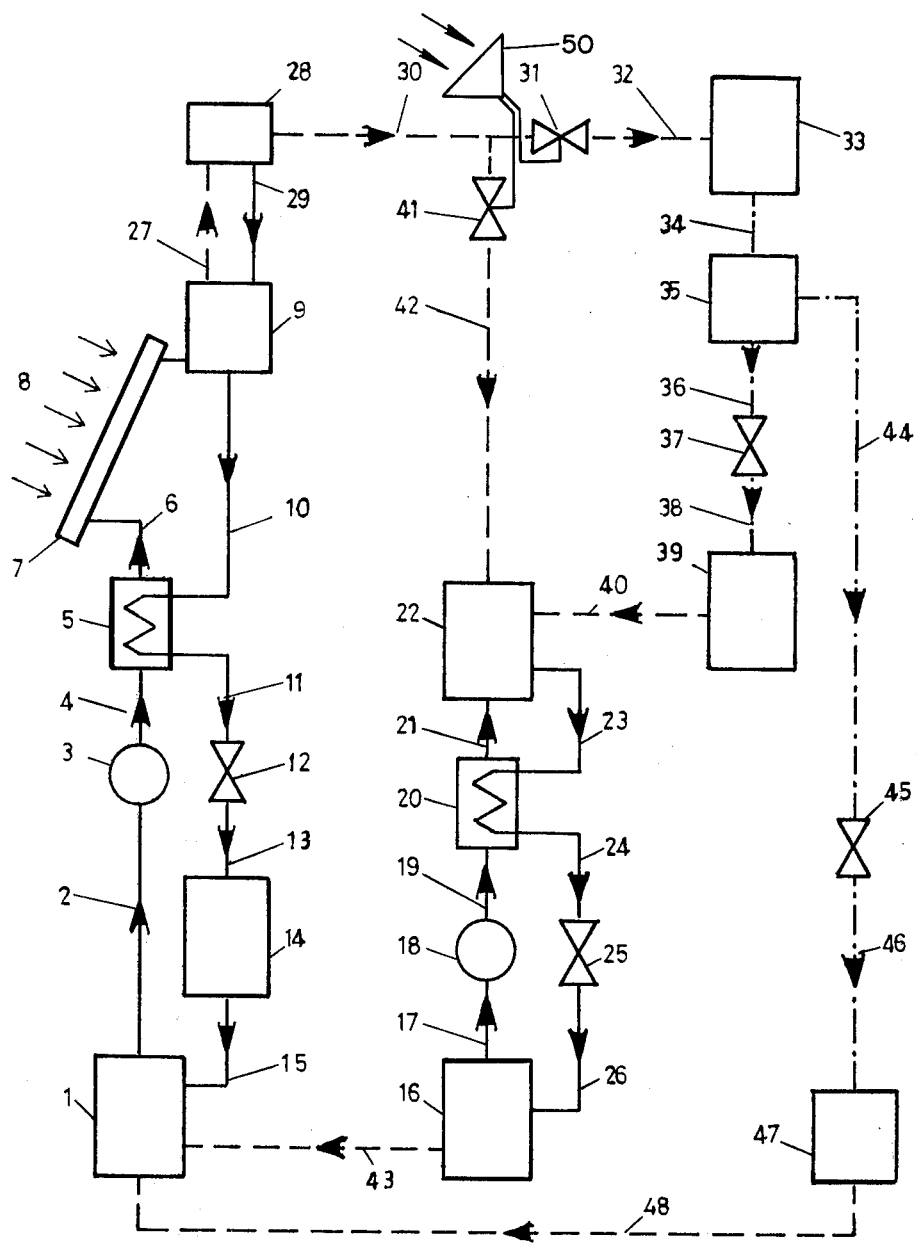

WATER-AMMONIA REFRIGERATION SYSTEM USING SOLAR ENERGY

This invention relates to a water-ammonia refrigeration system using solar energy.

An object of this invention is to provide interrelated circuits in which rich and weak ammonia solutions, ammonia vapor and liquid ammonia are circulated by pumping means through various deabsorbing low pressure boilers and reabsorbers, and in which solar radiation is used to boil such solution and produce ammonia vapor. The deabsorbing boilers produce cooling effects suitable for air conditioning and food preservation to obtain maximum efficiency, the intensity of the solar radiation is used to control alternative modes of operation of the interrelated circuits.

In accordance with the invention, a water-ammonia refrigeration system using solar energy is provided, comprising a. a first amonia solution circuit including a solar radiation heater connected to a high pressure deabsorbing boiler for producing ammonia vapor, a reabsorber for ammonia vapor, and a pump for circulating rich solution to the heater and boiler and returning weak solution to the reabsorber;

b. a second ammonia solution circuit including a reabsorber for ammonia vapor, a low pressure deabsorbing boiler to produce ammonia vapor and cool the solution for cooling purposes, and a pump for circulating weak solution from the boiler to the reabsorber;

c. an ammonia vapor circuit including means having a first valve therein for conveying ammonia vapor from the high pressure deabsorbing boiler of the first solution circuit to the reabsorber of the second solution circuit;

d. an ammonia vapor and liquid ammonia circuit including means having a second valve therein for conveying vapor from the high pressure deabsorbing boiler of the first solution circuit to a condenser, means for conveying liquid ammonia from the condenser to evaporator means to produce ammonia vapor and cool the liquid ammonia for cooling purposes, and means for conveying the ammonia vapor to the reabsorber of the second liquid circuit; and e. means responsive to the intensity of solar radiation for closing said first valve and opening said second valve when the solar radiation intensity is greater than a predetermined value and for opening said first valve and closing said second valve when the solar radiation intensity is less than said predetermined value.

In order that the invention may be fully understood it will now be described with reference to the accompanying drawing, in which the interrelated circuits are shown diagrammatically. The flow lines for the ammonia solution circuits containing rich or weak water-ammonia solutions are shown by unbroken lines, thus —. The flow lines for ammonia vapor are shown by broken lines, thus- -, and the flow lines for liquid ammonia by broken dotted lines, thus- -.

In the first of the water-ammonia circuits the rich water-ammonia leaves the absorber 1 (at a concentration approximately equal to 0.44 lb. of ammonia per lb. of solution) through pipe 2. The rich solution enters pump 3 where the pressure is increased. From the pump rich solution flows through pipe 4 to the heat exchanger 5 where it is heated by the weak solution returning from the generator. From the heat exchanger 5 the rich solution enters pipe 6 and is led to the flat plate solar collector 7 in which the solution begins to boil as it is heated by incoming solar radiation 8. Separation of ammonia vapor from the boiling rich solution takes place in the high pressure deabsorbing boiler 9 and the weak solution returns via pipe 10 through the heat exchanger 5, through pipe 11 to the flow constrictor or regulating valve 12. The pump 3 preferably increases the pressure of the rich solution to the pressure in boiler 9. The pressure of the weak solution is reduced in the flow constrictor, and the weak solution enters the solution storage vessel 14 from whence it enters the reabsorber 1 via pipe 15. The flow constrictor 12 preferably reduces the pressure of the weak solution to the pressure in reabsorber 1. In the reabsorber, the entering weak solution absorbs ammonia vapor entering through pipes 43 and 48 and is enriched. Rich solution leaves the absorber through pipe 2. The first solution circuit is thus completed.

The second water-ammonia circuit is quite separate from the first circuit described above. The concentration of the rich solution in this circuit is about 0.62 lb. ammonia per lb. of solution. This rich solution leaves the reabsorber 22 via pipe 23 and enters the heat exchanger 20 where it is cooled. From the heat exchanger the solution flows through pipe 24 to a flow consistrictor or regulating valve 25 which reduce the pressure of the solution suitably. From the flow constrictor the rich solution flows through pipe 26 to the low pressure deabsorbing boiler 16 where the rich solution boils at a low pressure which is almost the same as the pressure in the reabsorber 1. The boiling of this rich solution at a temperature of about 45°–50° F (7°–10° C) produces a cooling effect which is adequate for air conditioning purposes. The ammonia vapor boiling off from the solution flows via pipe 43 into the reabsorber 1 while the weak solution leaves the deabsorbing boiler 16 via pipe 17 to a pump 18 which builds up the solution pressure to that obtaining in the reabsorber 22. From the pump the weak solution travels via pipe 19 to the heat exchanger where heat is absorbed from the strong solution entering from 23. The weak solution leaves the heat exchanger via pipe 21 to enter the reabsorber where it absorbs ammonia vapor entering either through pipe 40 or through pipe 42 depending upon the operating mode hereinafter described. The weak solution entering is thereby enriched, and attains the maximum concentration again. The second solution circuit is thus completed.

Refrigerant vapor leaving the boiler 9 by pipe 27 is cooled suitably in the reflux condenser 28 so that most of the water vapor associated is condensed and returned (with some ammonia in solution) to the boiler by pipe 29. Nearly pure ammonia vapor leaves the reflux condenser by pipe 30.

This vapor is directed either through valve 31 or through valve 41 depending upon the operating mode. Valves 31 and 41 are controlled by a solar radiation intensity sensor 50. The sensor 50 may be any device sensitive to temperature change when exposed to solar radiation, such as a fluid-filled bulb, a bimetallic strip or coil, a thermocouple, a thermopile, and the like. Alternatively valves 31 and 41 may be operated by a temperature sensor controlled by the temperature of the solution entering the boiler 9 from the solar collector 7, since the temperature of the solution leaving the collector is itself governed by the solar radiation intensity.

If, for example, a thermopile was utilized as a solar radiation intensity sensor 50 its electric power output would be responsive and dependent on the intensity of solar radiation. Valves 31 and 41 could be solenoid type valves and the thermopile output operating through suitable relays could open and close valves 31 and 41 as desired.

When the solar radiation intensity is greater than a predetermined valve, valve 41 is closed and valve 31 is opened by the sensor 50. This is the first of the two modes of operation possible.

Ammonia vapor flowing through pipe 32 enters condenser 33 and is condensed. Liquid ammonia leaves the condenser by pipe 34 to enter the refrigerant storage vessel 35.

From the refrigerant storage one stream leaves via pipe 36 to enter the expansion valve 37. The pressure of the liquid ammonia is thereby reduced and it boils in the evaporator 39 at a temperature of about 45–50° F (7°–10° C) producing a cooling effect which is adequate for air conditioning purposes. The vapor leaving the evaporator 39 by pipe 40 enters the reabsorber 22 where it is absorbed in the water-ammonia solution, thereby entering the solution circuit.

When the refrigerator is operating in this mode it will be observed that double effect cooling at 45°–50° F is achieved, the first effect occurring in the evaporator 39 and the second effect in the deabsorbing boiler 16.

When the solar radiation intensity is less than the predetermined valve, valve 31 is closed and valve 41 is opened by the sensor 50. This initiates the second of the two modes of operation possible.

In this mode the condenser is bypassed and the ammonia vapor from pipe 30 passes through valve 41 via valve 42 directly to the reabsorber 22. The ammonia solution entering the reabsorber is enriched and the cooling effect in the deabsorbing boiler 16 continues to take place as described in paragraph 3 above. In this mode only a single effect cooling at 45°–50° F is achieved.

As long as the refrigerator is operating in the first mode or as long as there is liquid refrigerant present in refrigerant storage vessel 35, the third refrigerant circuit can remain in operation as described below.

Liquid refrigerant leaves storage 35 via pipe 44 to enter the expansion valve 45. The pressure is reduced to a valve almost equal to the pressure in reabsober 1. The liquid refrigerant therefore boils in evaporator 47 producing a cooling effect at a temperature of about 15° F (−10° C) which is adequate for food preservation.

The coefficient of performance of the system in the double effect mode is considerably more than in the single effect mode — but the system works better in the double effect mode only when the solar radiation intensity is high. At lower intensities rates the operation in the single effect mode is more efficient. Arranging for operation in the dual mode enables advantage to be taken of the characteristics of both modes.

A comparative study using a computer of the performance of this arrangement to produce air conditioning over a period of 1 year in a tropical situation showed that the cooling produced in dual mode operation was 17% better than operation in the single effect mode alone and 22% better than operation in the double effect mode alone. Furthermore when compared to the performance of a conventional arrangement (consisting for example of generator, absorber, condenser and evaporator) the improvement was 45%.

Hence for a given cooling load which includes both air conditioning and food preservation the flat plate solar collector area required for the cycle described above operating in the dual mode will be less than for any other ammonia water absorption refrigeration cycle operated by solar energy.

Various modifications can be made in the arrangements described without departing from the scope of the invention.

What we claim is:

1. A water-ammonia refrigeration system using solar energy, comprising
   a. a first ammonia solution circuit including a solar radiation heater connected to a high pressure deabsorbing boiler for producing ammonia vapor, a reabsorber for ammonia vapor, and a pump for circulating rich solution to the heater and boiler and returning weak solution to the reabsorber;
   b. a second ammonia solution circuit including a reabsorber for ammonia vapor, a low pressure deabsorbing boiler to produce ammonia vapor and cool the solution for cooling purposes, and a pump for circulating weak solution from the boiler to the reabsorber;
   c. an ammonia vapor circuit including means having a first valve therein for conveying ammonia vapor from the high pressure deabsorbing boiler of the first solution circuit to the reabsorber of the second solution circuit;
   d. an ammonia vapor and liquid ammonia circuit including means having a second valve therein for conveying vapor from the high pressure deabsorbing boiler of the first solution circuit to a condenser, means for conveying liquid ammonia from the condenser to evaporator means to produce ammonia vapor and cool the liquid ammonia for cooling purposes, and means for conveying the ammonia vapor to the reabsorber of the second liquid circuit; and
   e. means responsive to the intensity of solar radiation for closing said first valve and opening said second valve when the solar radiation intensity is greater than a predetermined valve and for opening said first valve and closing said second valve when the solar radiation intensity is less than said predetermined valve.

2. A system according to claim 1 in which, in said first solution circuit, the rich solution proceeding to the solar radiation heater is heated in a heat exchanger by weak solution from the deabsorbing boiler.

3. A system according to claim 1 in which said first solution circuit includes flow constrictor means for controlling the pressure of the solution.

4. A system according to claim 1 in which, in said second solution circuit, the rich solution proceeding to the low pressure deabsorbing boiler is cooled in a heat exchanger by weak solution from the boiler.

5. A system according to claim 1 in which said second solution circuit includes flow constrictor means for controlling the pressure of the solution.

6. A system according to claim 1 in which said ammonia vapor and liquid ammonia circuit includes a liquid ammonia storage vessel, means for conveying liquid ammonia therefrom to evaporator means to produce ammonia vapor and cool the liquid ammonia for cooling purposes, and means for conveying the ammonia vapor to the reabsorber of said first liquid circuit.

* * * * *